J. C. EGGLESTON.
Car-Axle Box.
No. 58,339.
Patented Sept. 25, 1866.
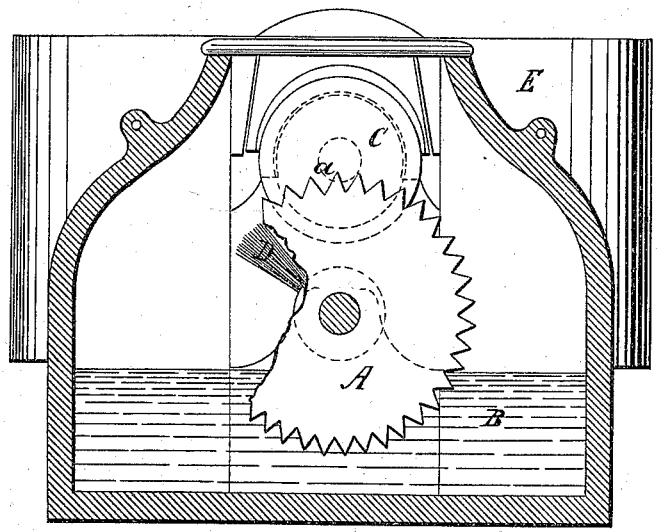
Witnesses:
Inventor:

UNITED STATES PATENT OFFICE.

JOHN C. EGGLESTON, OF WATERBURY, CONNECTICUT, ASSIGNOR TO HIMSELF, E. M. HITCHCOCK, AND G. W. BEACH.

IMPROVED LUBRICATING APPARATUS.

Specification forming part of Letters Patent No. 58,339, dated September 25, 1866.

*To all whom it may concern:*

Be it known that I, J. C. EGGLESTON, of Waterbury, New Haven county, and State of Connecticut, have invented a new and Improved Device for Lubricating Car-Axles; and I do hereby declare that the following is a full, clear, and exact description thereof, which will enable others skilled in the art to make and use the same, reference being had to the accompanying drawing, forming part of this specification.

The nature of my invention consists in providing a pintle upon the end of the shaft of a car-wheel, which meshes into a toothed wheel at every revolution of the shaft or axle.

The toothed wheel is secured to a small shaft, and runs upon bearings in the oil-chamber. Upon the shaft of the toothed wheel is a brush, that dips in the oil at every revolution, and in its turn brings the oil from the chamber up against the bearing, making it one of the best and most economical lubricating devices now used.

To enable others skilled in the art to make and use my invention, I will proceed to describe its construction and operation.

The figure is a transverse elevation of my improved lubricating device.

Letters of like name and kind refer to like parts in the figure.

A represents a toothed wheel, secured to a shaft which runs on journals in suitable bearings in the oil-chamber B.

D is a brush, secured to the shaft of the wheel A.

C is the axle of the car, at the end of which is a pintle, *a*, which projects out from the end of the axle. This pintle is placed at a suitable distance from the center of the axle, and at every revolution engages the toothed wheel A, which moves it a short distance, when it becomes disengaged until it makes another turn, when it again engages the teeth and moves it again, and so on until the brush comes from the oil and deposits a quantity upon the bearing of the axle.

B is the oil-chamber, located at the end of the axle and made of iron.

E represents the jaws, of common construction, made of iron, and in which the bearings are placed in which the journals of the axle run.

The operation is simply in filling the chamber with oil, and as the car is put in motion, by means of the pintle working in the toothed wheel A the brush is also put in motion, and at every turn is dipped in the oil, bringing it from the chamber and depositing it on the bearing of the axle, which keeps the said bearing constantly lubricated and prevents its becoming hot.

Various methods have been devised for lubricating car-axles, and many of them have proved unsuccessful and unsatisfactory in not accomplishing the object for which they were designed, and being very extravagant in the use of oil. By my invention all these objections are removed, for the reason that no oil is wasted, and is applied directly to the bearing, requiring no waste or any other absorbing material for the purpose of retaining and applying the oil.

Having thus described my invention, what I claim as new, and desire to secure by Letters Patent, is—

1. The brush D and toothed wheel A, combined and operating substantially as described, for the purpose specified.

2. The pintle *a*, in combination with the wheel A, brush D, and oil-chamber B, all substantially as and for the purposes set forth.

The above specification of my invention signed by me this 15th day of June, 1866.

JOHN C. EGGLESTON.

Witnesses:
   WM. F. MCNAMARA,
   ALEX. F. ROBERTS.